(12) United States Patent  
Fujiwara

(10) Patent No.: US 9,056,591 B2  
(45) Date of Patent: Jun. 16, 2015

(54) SIDE AIRBAG FOR VEHICLE

(75) Inventor: Yusuke Fujiwara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/374,347

(22) PCT Filed: Feb. 1, 2012

(86) PCT No.: PCT/JP2012/052281  
§ 371 (c)(1),  
(2), (4) Date: Jul. 24, 2014

(87) PCT Pub. No.: WO2013/114591  
PCT Pub. Date: Aug. 8, 2013

(65) Prior Publication Data  
US 2015/0014970 A1 Jan. 15, 2015

(51) Int. Cl.  
*B60R 21/207* (2006.01)  
*B60R 21/231* (2011.01)  
*B60R 21/2346* (2011.01)  
*B60R 21/233* (2006.01)

(52) U.S. Cl.  
CPC ....... *B60R 21/23138* (2013.01); *B60R 21/2346* (2013.01); *B60R 2021/23146* (2013.01); *B60R 21/233* (2013.01); *B60R 2021/23332* (2013.01)

(58) Field of Classification Search  
USPC ............................................. 280/729, 730.2  
See application file for complete search history.

(56) References Cited

U.S. PATENT DOCUMENTS

| | | | | |
|---|---|---|---|---|
| 5,586,783 | A | * | 12/1996 | Adam et al. .................. 280/737 |
| 6,059,311 | A | * | 5/2000 | Wipasuramonton et al. . 280/729 |
| 6,270,113 | B1 | | 8/2001 | Wipasuramonton et al. |
| 6,279,944 | B1 | | 8/2001 | Wipasuramonton et al. |
| 2002/0047253 | A1 | | 4/2002 | Rasch et al. |

(Continued)

FOREIGN PATENT DOCUMENTS

| JP | A-2001-354103 | 12/2001 |
|---|---|---|
| JP | A-2003-501303 | 1/2003 |
| JP | A-2005-112165 | 4/2005 |

(Continued)

*Primary Examiner* — Ruth Ilan  
*Assistant Examiner* — Darlene P Condra  
(74) *Attorney, Agent, or Firm* — Oliff PLC

(57) ABSTRACT

In a present side airbag device for a vehicle, a side airbag has a main bag and an inner bag that is disposed within the main bag. When gas for inflation and expansion is supplied from an inflator to an interior of the inner bag, the inner bag, while inflating and expanding, supplies supplied gas to the main bag. Due thereto, the main bag inflates and expands. At a time of this inflation and expansion, internal pressure of the inner bag becomes higher than internal pressure of the main bag. However, the inner bag is structured so as to be positioned further toward a vehicle rear side than a front edge portion of a door-side side portion of a seat back as seen in side view.

9 Claims, 8 Drawing Sheets

(56) References Cited

U.S. PATENT DOCUMENTS

| | | | |
|---|---|---|---|
| 2004/0164526 A1* | 8/2004 | Hasebe et al. | 280/729 |
| 2006/0038386 A1* | 2/2006 | Shibayama et al. | 280/730.2 |
| 2006/0071458 A1* | 4/2006 | Sendelbach et al. | 280/729 |
| 2008/0203711 A1* | 8/2008 | Shimono | 280/730.2 |
| 2009/0243268 A1* | 10/2009 | Suzuki et al. | 280/730.2 |
| 2009/0315305 A1* | 12/2009 | Evans et al. | 280/730.2 |
| 2010/0140906 A1 | 6/2010 | Honda et al. | |
| 2010/0140907 A1 | 6/2010 | Shimono | |
| 2010/0308568 A1* | 12/2010 | Okuhara | 280/730.2 |
| 2012/0038135 A1 | 2/2012 | Oomori et al. | |
| 2012/0248747 A1* | 10/2012 | Sugimoto et al. | 280/729 |
| 2012/0256400 A1 | 10/2012 | Shimono | |
| 2014/0151985 A1* | 6/2014 | Hotta et al. | 280/730.2 |

FOREIGN PATENT DOCUMENTS

| | | |
|---|---|---|
| JP | A-2008-201175 | 9/2008 |
| JP | A-2009-255706 | 11/2009 |
| JP | A-2010-137615 | 6/2010 |
| JP | A-2011-162012 | 8/2011 |
| WO | WO 2006/049093 A1 | 5/2006 |
| WO | WO 2010/122959 A1 | 10/2010 |

* cited by examiner

SIDE AIRBAG FOR VEHICLE

TECHNICAL FIELD

The present invention relates to a side airbag device for a vehicle that protects a passenger at the time of a side collision or the time of overturning of a vehicle.

BACKGROUND ART

In the side airbag device illustrated in following Patent Document 1, the interior of an airbag is sectioned in the vertical direction into three inflating portions (chambers), and an inner bag, that contains an inflator, is provided within the central inflating portion. The inner bag communicates with the upper inflating portion and the lower inflating portion through upper and lower openings, and communicates with the central inflating portion through an intermediate opening. Moreover, this inner bag is disposed such that, in the inflated and expanded state, the front end of the inner bag is positioned further toward the rear than the front end of the central inflating portion and further toward the front than the front end of a seat bag.

In the side airbag device of the above-described structure, gas for inflation that is jetted-out from the inflator is first supplied to the inner bag, and the inner bag expands. The gas for inflation that is within the inner bag flows from the upper opening of the inner bag into the upper inflating portion, and flows from the lower opening into the lower inflating portion, and flows from the central opening portion to the central inflating portion. Due thereto, the respective inflating portions inflate, and from the shoulder portion to the lumbar region of the passenger is restrained by the corresponding inflating portions of the airbag.

Further, the inner bag is disposed such that the front end of the inner bag is positioned as described above. Therefore, at the time of inflation and expansion of the airbag, due to the inner bag inflating in a vicinity of the side of the passenger, the passenger is restrained not only by the airbag (the main bag), but also by the inner bag (the internal bag). Due thereto, the restraining performance is improved.

PRIOR ART DOCUMENTS

Patent Documents

Patent Document 1: Japanese Patent Application Laid-Open (JP-A) No. 2010-137615

DISCLOSURE OF INVENTION

Technical Problem

In the above-described side airbag device, the shape and the like of the airbag are set in consideration of the performance of restraining a passenger who is seated in the regular seated position. However, at the time of a side collision or the time of overturning of the vehicle, there is the possibility that the side airbag will inflate and expand in a state in which the passenger is not seated in the regular seated position.

In view of the above-described circumstances, an object of the present invention is to provide a side airbag device for a vehicle that can improve, to better than the conventional art, the safety of a passenger at the time when a side airbag inflates and expands in a state in which the passenger is not seated in the regular seated position.

Solution to Problem

A side airbag device for a vehicle of a first aspect of the present invention comprises: an inflator that is supported at a side frame disposed within a side portion of a seat bag, and that supplies gas for inflation and expansion; and a side airbag that has a main bag, that is stored in a folded-up state within the side portion and that inflates and expands toward a vehicle front side of the side portion at a time when the gas for inflation and expansion is supplied thereto, and has an inner bag, that is disposed within the main bag, that supplies supplied gas to the main bag while inflating and expanding due to the gas for inflation and expansion being supplied thereto, and that, at a time of inflation and expansion, is positioned further toward a vehicle rear side than a front edge portion of the side portion as seen in side view.

Note that the "time of inflation and expansion" that is recited in claim 1 is the time period in which at least the inflator is supplying the gas for inflation and expansion, and includes in the midst of inflation and expansion and after inflation and expansion are completed.

In the first aspect, when the gas for inflation and expansion is supplied from the inflator to the inner bag of the side airbag, the inner bag, while inflating and expanding, supplies the supplied gas to the main bag. Due thereto, the main bag inflates and expands toward the vehicle front side of the side portion of the seat back. At this time of inflation and expansion, the internal pressure of the inner bag becomes higher than the internal pressure of the main bag, but the inner bag is structured so as to be positioned further toward the vehicle rear side than the front edge portion of the side portion of the seat back as seen in side view. Therefore, even in a case in which the main bag and the inner bag inflate and expand in a state in which the passenger is positioned at (is leaning on) the vehicle front side of the side portion that is other than the regular seated position, the passenger receiving load from the high-pressure inner bag can be prevented or effectively suppressed. Due thereto, the safety of the passenger can be improved to better than the conventional art.

In a side airbag device for a vehicle of a second aspect of the present invention, in the first aspect, a sewn portion of a seat skin, that receives inflation pressure of the side airbag and splits, is provided at a front portion side of the side portion, due to the sewn portion splitting, an opening portion for inflating and expanding the main bag is formed at a front surface side of the side portion, and a shape of the inner bag is set such that, at a time of inflation and expansion, the inner bag is positioned further toward a vehicle rear side than the opening portion.

In the second aspect, the sewn portion of the seat skin, that is provided at the front portion side of the side portion of the seat back, receives inflation pressure of the side airbag and splits. Due thereto, an opening portion is formed at the front surface side of the side portion, and the main bag inflates and expands toward the vehicle front side of the side portion via this opening portion. Here, the inner bag is structured so as to be positioned further toward the vehicle rear side than the aforementioned opening portion at the time of inflation and expansion. Therefore, even in a case in which the main bag and the inner bag inflate and expand in a state in which the passenger is positioned at the vehicle front side of the aforementioned opening portion, the passenger receiving load from the high-pressure inner bag can be prevented or effectively suppressed.

In a side airbag device for a vehicle of a third aspect of the present invention, in the first aspect or the second aspect, a shape of the inner bag is set such that the inner bag inflates and expands within the side portion.

In the third aspect, the inner bag inflates and expands within the side portion, i.e., in a range of not jutting-out to the outer side of the side portion. Therefore, the passenger receiving load from the high-pressure inner bag can be prevented or effectively suppressed regardless of the seated position (the seated posture) of the passenger.

In a side airbag device for a vehicle of a fourth aspect of the present invention, in any one aspect of the first through third aspects, an interior of the main bag is sectioned into a chest region chamber for restraining a chest region of a passenger and a lumbar region chamber for restraining a lumbar region of a passenger, and the inner bag is provided at the chest region chamber, communicates with the chest region chamber via a communication hole, and communicates with the lumbar region chamber via an inner tube.

In the fourth aspect, the side airbag is made to be a so-called two-chamber side airbag in which the interior of the main bag is sectioned into a chest region chamber and a lumbar region chamber. In such a two-chamber side airbag, generally, the expansion speed is fast and the internal pressure is high pressure due to the rise rate and the output of the inflator being set to be high. With regard to this point, the present aspect is ideal because the passenger receiving load from the inner bag, that has higher pressure than the main bag, can be prevented or suppressed effectively in the same way as in the first through third aspects.

In a side airbag device for a vehicle of a fifth aspect of the present invention, in the fourth aspect, the inner tube structures a check valve that closes-off due to internal pressure of the lumbar region chamber rising to greater than or equal to a set value.

In the fifth aspect, when the internal pressure of the lumbar region chamber of the main bag rises to greater than or equal to a set value due to the gas for inflation and expansion that is supplied from the inner bag via the inner tube, the inner tube closes-off. Due thereto, backward flowing of gas from the lumbar region chamber to the inner bag is impeded, and the internal pressure of the lumbar region chamber can be maintained in a high state. Therefore, the lumbar region of the passenger, that has higher impact-resistance than the chest region of the passenger, can be restrained well by the lumbar region chamber.

In a side airbag device for a vehicle of a sixth aspect of the present invention, in any one aspect of the first through fifth aspects, a shape of the main bag is set such that a longitudinal direction dimension of an upper portion side is smaller than a longitudinal direction dimension of a lower portion side, in a case of viewing an inflated and expanded state in side view.

In the sixth aspect, the main bag inflates and expands such that the longitudinal direction dimension of the upper portion side is smaller than the longitudinal direction dimension of the lower portion side. Therefore, even in a case in which the main bag inflates and expands in a state in which the passenger is positioned in the direction of inflation and expansion of the main bag, the load that the neck region and the upper portion side of the chest region of the passenger receive from the upper portion side of the main bag can be reduced.

In a side airbag device for a vehicle of a seventh aspect of the present invention, in any one aspect of the first through sixth aspects, a communication hole, that communicates an interior of the main bag and an interior of the inner bag, is formed at a lower portion side of the inner bag, and an upper portion side of the inner bag is closed-off.

In the seventh aspect, the gas for inflation and expansion, that is supplied from the inflator to the inner bag, is supplied to the main bag via the communication hole formed at the lower portion side of the inner bag, but the upper portion side of the inner bag is closed-off. Due thereto, the internal pressure of the upper portion side of the main bag in the initial stage of expansion can be made to be low. Therefore, even in a case in which the main bag inflates and expands in a state in which the passenger is positioned in the direction of inflation and expansion of the main bag, the load that the neck region and the upper portion side of the chest region of the passenger receive from the upper portion side of the main bag can be reduced.

In a side airbag device for a vehicle of an eighth aspect of the present invention, in any one aspect of the first through sixth aspects, communication holes, that communicate an interior of the main bag and an interior of the inner bag, are formed at an upper portion side and a lower portion side of the inner bag, and, in a folded-up state of the main bag, the upper portion side of the inner bag is folded in two in a vehicle transverse direction.

In the eighth aspect, the gas for inflation and expansion, that is supplied from the inflator to the inner bag, is supplied to the main bag via the communication holes that are formed at the upper portion side and the lower portion side of the inner bag. Due thereto, the expansion speed of the main bag can be made to be fast. However, in the folded-up state of the main bag, the upper portion side of the inner bag is folded in two in the vehicle transverse direction. Therefore, the communication hole at the upper portion side of the inner bag can be closed-off until this portion that is folded in two expands. Due thereto, inflation, in the vehicle longitudinal direction, of the upper portion side of the main bag in the initial stage of expansion can be suppressed. Therefore, even in a case in which the main bag inflates and expands in a state in which the passenger is positioned in the direction of inflation and expansion of the main bag, the load that the neck region and the upper portion side of the chest region of the passenger receive from the upper portion side of the main bag can be reduced.

In a side airbag device for a vehicle of a ninth aspect of the present invention, in the eighth aspect, in the folded-up state of the main bag, the upper portion side of the inner bag is folded in two toward a vehicle transverse direction outer side.

In the ninth aspect, the communication hole at the upper portion side of the inner bag can be closed-off until the upper portion side of the inner bag, that is folded in two toward the vehicle transverse direction outer side in the folded-up state of the main bag, expands. Here, because there is ample space between the side airbag and the door trim at the vehicle transverse direction outer side of the side airbag, this portion that is folded in two can be expanded smoothly.

Advantageous Effects of Invention

As described above, in the side airbag device for a vehicle relating to the present invention, the safety of a passenger, at the time when a side airbag inflates and expands in a state in which the passenger is not seated in the regular seated position, can be improved to better than the conventional art.

BEST MODES FOR CARRYING OUT THE INVENTION

<First Embodiment>

A side airbag device 10 for a vehicle (hereinafter simply called side airbag device 10) that relates to a first embodiment of the present invention is described hereinafter by using FIG. 1 through FIG. 6. Note that arrow FR that is shown in FIG. 1 indicates the vehicle front side, arrow UP indicates the vehicle upper side, and arrow IN indicates the vehicle transverse direction inner side.

Figure 1:
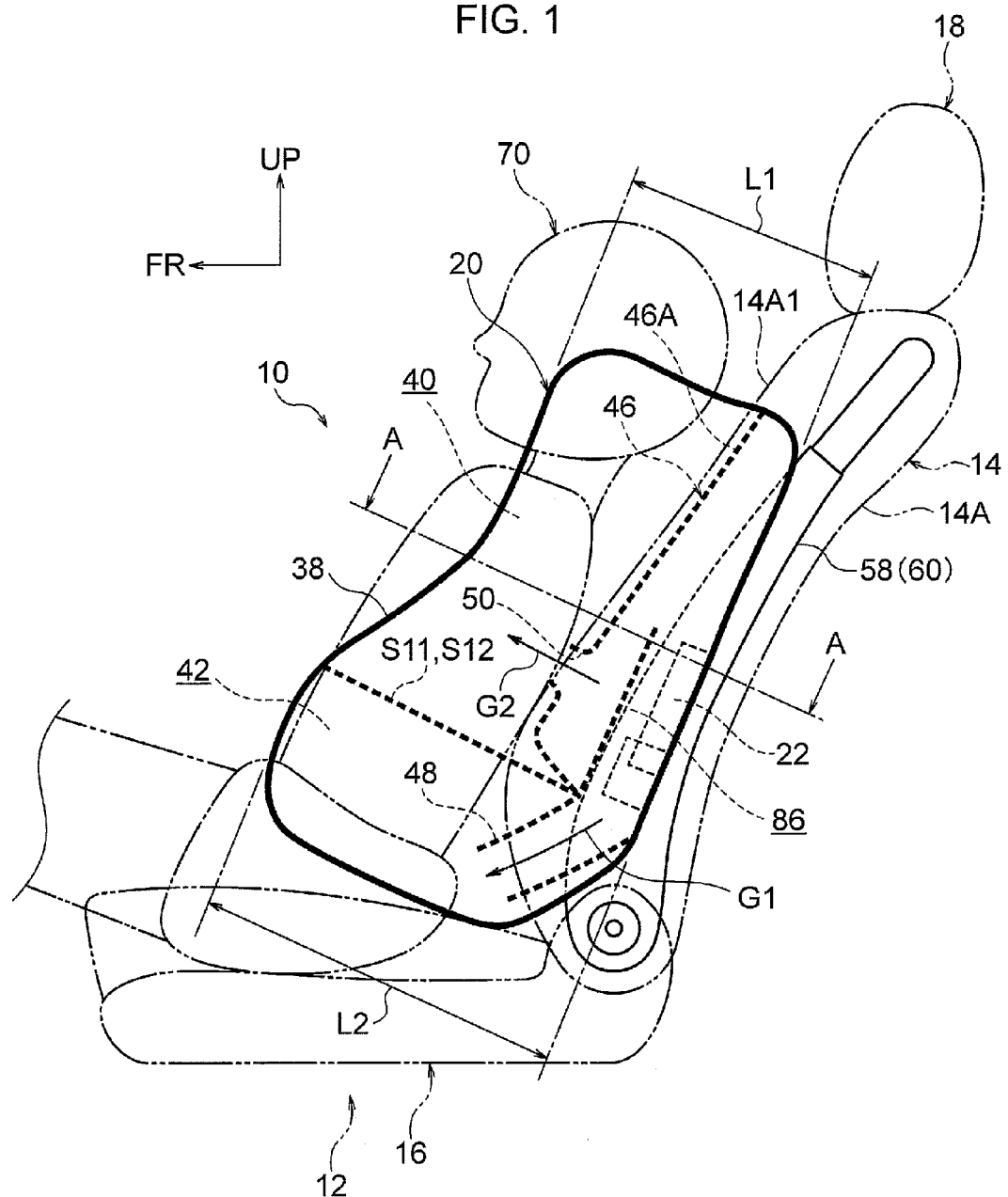
FIG. 1 is schematic side view showing a state in which a side airbag, of a side airbag device for a vehicle relating to a first embodiment of the present invention, has inflated and expanded.
Figure 2:
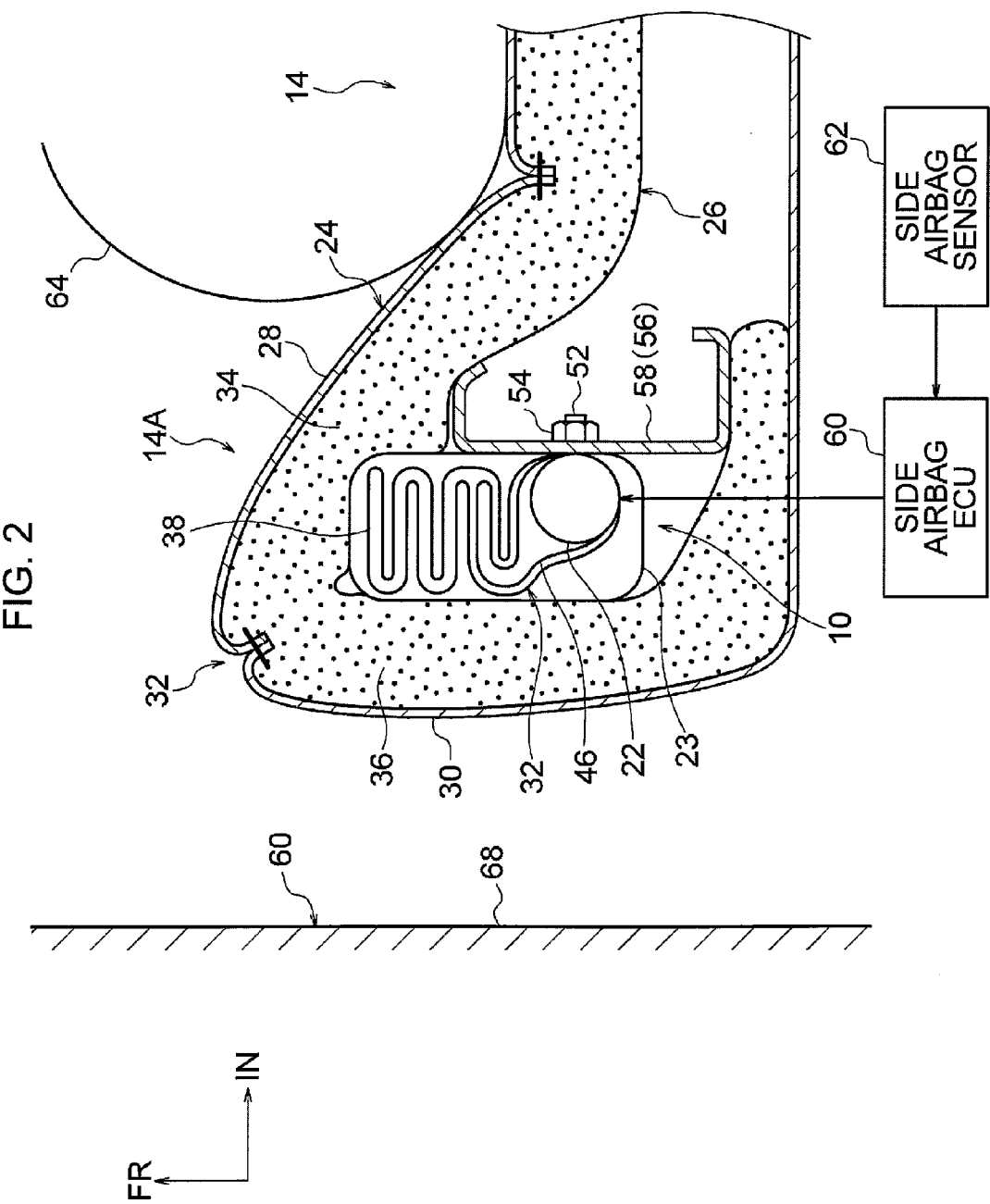
FIG. 2 is a plan sectional view showing the partial structure of a seat back in which the side airbag device is installed, and is a drawing of before the side airbag inflates and expands.
Figure 3:
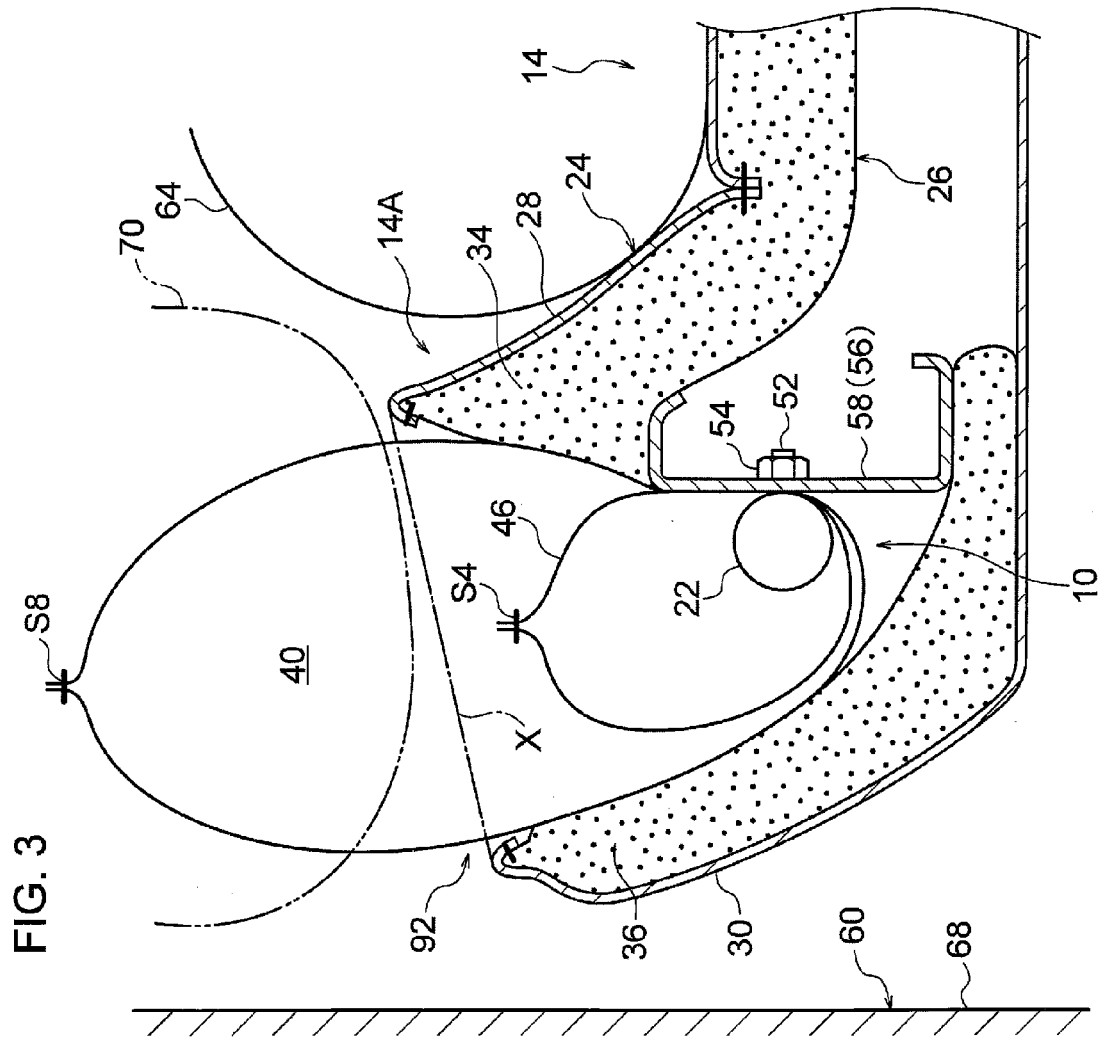
FIG. 3 is a plan sectional view that corresponds to FIG. 2 and shows the state in which the side airbag has inflated and expanded, and is an enlarged plan sectional view showing the cross-section along line A-A of FIG. 1.

As shown in FIG. 1 through FIG. 3, the side airbag device 10 relating to the present first embodiment is installed in a door-side side portion 14A (the side portion at the side of an unillustrated side door: the side portion at the vehicle transverse direction outer side) of a seat back 14 at a vehicle seat 12. This seat back 14 is tiltably connected to the rear end portion of a seat cushion 16, and a head rest 18 is connected to the upper end portion of the seat back 14. Note that, in the present embodiment, the forward direction, the upward direction and the transverse direction of the vehicle seat 12 coincide with the forward direction, the upward direction and the transverse direction of the vehicle.

The side airbag device 10 has a side airbag 20, and an inflator 22 that serves as a gas supplying means and supplies gas for inflation and expansion (hereinafter simply called "gas") to the interior of the side airbag 20. As shown in FIG. 2, at this side airbag device 10, the side airbag 20 is, in a state of being folded-up, made into a unit together with the inflator 22 and the like, and the side airbag device 10 is placed at the interior of the door-side side portion 14A. Note that FIG. 1 and FIG. 3 illustrate a state in which the side airbag 20 has been inflated and expanded (a state in which inflation and expansion are completed) due to the pressure of the gas supplied from the inflator 22. Further, 23 in FIG. 2 is a wrapping material that can be broken easily at the time of inflation and expansion of the side airbag 20.

A seat bag pad (a urethane pad) 26, that is covered by a seat skin 24, is disposed at the periphery of the side airbag device 10. The seat skin 24 has a front surface portion 28 that structures the front surface of the door-side side portion 14A, and a frame portion 30 that structures the vehicle transverse direction outer side surface of the door-side side portion 14A. A sewn portion 32 of the front surface portion 28 and the frame portion 30 is provided at the front end portion of the door-side side portion 14A. This sewn portion 32 extends in the seat bag height direction along the front edge portion of the door-side side portion 14A as seen in side view. Further, as shown in FIG. 3, there is a structure in which, at the time when the side airbag 20 inflates and expands, the seat bag pad 26 receives the expansion pressure of the side airbag 20 and splits into a pad inner side portion 34 and a pad outer side portion 36, and the seat skin 24 splits at the sewn portion 32.

As shown in FIG. 1, the side airbag 20 is a so-called two-chamber side airbag, and has a main bag 38 that is sewn in the shape of a bag. The interior of the main bag 38 is sectioned by a tether 39 into a chest region chamber 40 for restraining the chest region of the passenger, and a lumbar region chamber 42 for restraining the lumbar region of the passenger. An inner bag 46 (flow adjusting fabric) that is formed in the shape of an elongated bag is disposed within the chest region chamber 40, and an inner tube 48 is provided integrally with the lower end portion of this inner bag 46. This inner tube 48 projects-out into the lumbar region chamber 42, and the interior of the inner bag 46 and the interior of the lumbar region chamber 42 are communicated via the interior of this inner tube 48. Further, a communication hole 50 (a flow path of the gas) is formed at the inner bag 46, and the interior of the inner bag 46 and the chest region chamber 40 are communicated via this communication hole 50.

The inflator 22 is accommodated within the above-described inner bag 46. The inflator 22 is formed in a solid cylindrical shape, and is disposed in a state in which the axial direction thereof runs along the height direction of the seat back 14. A pair of upper and lower stud bolts 52 (see FIG. 2 and FIG. 3) project-out from the outer peripheral portion of the inflator 22 toward the seat transverse direction inner side. These stud bolts 52 are passed-through the inner bag 46, the main bag 38 and a side frame 58 of a seat back frame 56, and the distal end sides thereof are screwed-together with nuts 54. Due thereto, the inflator 22 is, together with the side airbag 20, fixed to the side frame 58.

A side airbag ECU 60 and a side airbag sensor 62 that are installed in the vehicle are electrically connected to the above-described inflator 22. At the time when the automobile is in a side collision or overturns or the like, this side airbag ECU 60 judges, on the basis of sensed signals from the side airbag sensor 62, whether or not to operate the side airbag device 10. When this judgment is affirmative, a predetermined current is supplied to the inflator 22. Due thereto, the inflator 22 operates, and gas is jetted out from unillustrated gas jetting ports that are provided at the lower end side of the inflator 22.

The gas that is jetted-out from the inflator 22 is supplied to the interior of the lumbar region chamber 42 via the lower end opening portion of the inner tube 48 (see arrow G1 in FIG. 1), and is supplied to the interior of the chest region chamber 40 via the communication hole 50 of the inner bag 46 (see arrow G2 of FIG. 1). Due thereto, as shown in FIG. 3, the side airbag 20 inflates and expands between a side door 66 and a passenger 64 who is seated in the regular seated position in the vehicle seat 12.

Concretely, the lumbar region chamber 42 inflates and expands between the lumbar region of the passenger 64 and a door trim 68 of the side door 66, and the lumbar region of the passenger 64 is restrained by this lumbar region chamber 42. Further, the chest region chamber 40 inflates and expands between the chest region of the passenger 64 and the door trim 68 of the side door 66, and the chest region of the aforementioned passenger 64 is restrained by this chest region chamber 40. In this case, due to the gas jetting ports of the inflator 22 being disposed so as to face downward, there is a structure in which the lumbar region chamber 42 completes expansion at an earlier stage than (before) the chest region chamber 40.

Further, there is a structure in which the internal pressure of the lumbar region chamber 42 becomes higher than the internal pressure of the chest region chamber 40. When the internal pressure of the lumbar region chamber 42 rises to greater than or equal to a set value that is set in advance, the inner tube 48 is crushed and closes-off. Due thereto, the gas within the lumbar region chamber 42 flowing-in (flowing backward) into the inner bag 46 via the interior of the inner tube 48 is prevented. Namely, the inner tube 48 is structured so as to function also as a check valve that prevents flowing of gas from the interior of the lumbar region chamber 42 into the interior of the inner bag 46.

Note that, as shown in FIG. 1 and FIG. 3, in relation to explaining main portions of the present embodiment, a passenger 70, who is positioned at the vehicle front of the door-side side portion 14A of the seat back 14 (who is in other than the regular seated position: out-of-position), is shown by the two-dot chain line. This passenger 70 is, for example, a passenger of a small physique such as a child or the like.

(Structure of Side Airbag 20)

Figure 4:
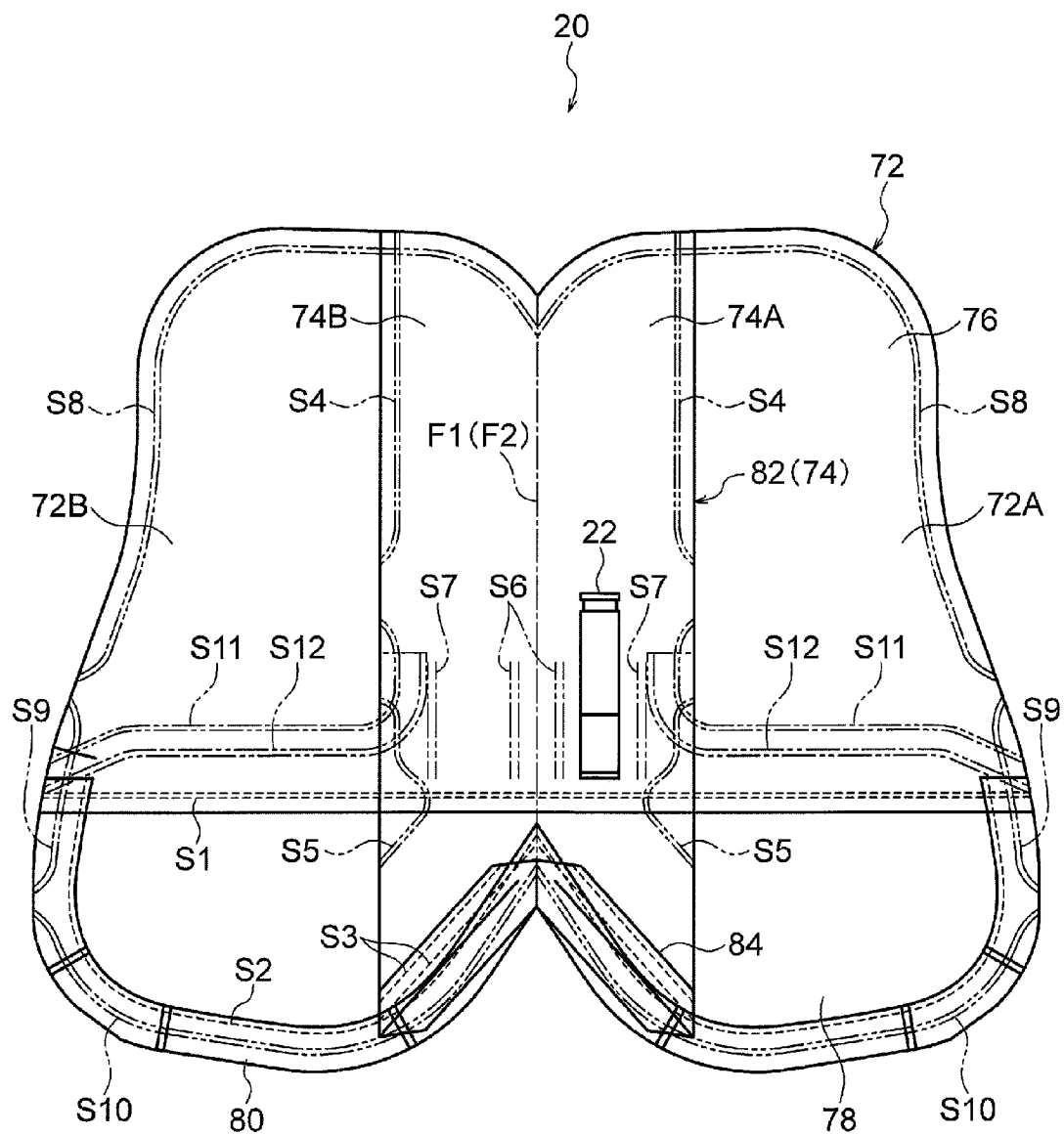
FIG. 4 is a planar development showing a state before sewing of the side airbag.

The structure of the above-described side airbag 20 is described in detail next. A planar development that shows the state before sewing of the side airbag 20 is shown in FIG. 4. This side airbag 20 is formed by a main panel 72 and an inner panel 74 being sewn together. The main panel 72 is formed by the lower end portion of a base cloth 76, that is for forming the chest region chamber 40, and the vertical direction intermediate portion of a base cloth 78, that is for forming the lumbar region chamber 42, being sewn together at sewn portion S1. A reinforcing cloth 80 is sewn to the lower edge side of this main panel 72 at sewn portion S2. On the other hand, the inner panel 74 is structured by a single, elongated base cloth 82. One longitudinal direction end side of this base cloth 82 is disposed within the lumbar region chamber 42, and the other longitudinal direction end side is disposed within the chest region chamber 40. One longitudinal direction end portion of the base cloth 82 is cut-out in a triangular form in correspondence with the shape of the lower end side of the main panel 72. A reinforcing cloth 84 is sewn to this one longitudinal direction end portion at sewn portions S3.

Figure 5:
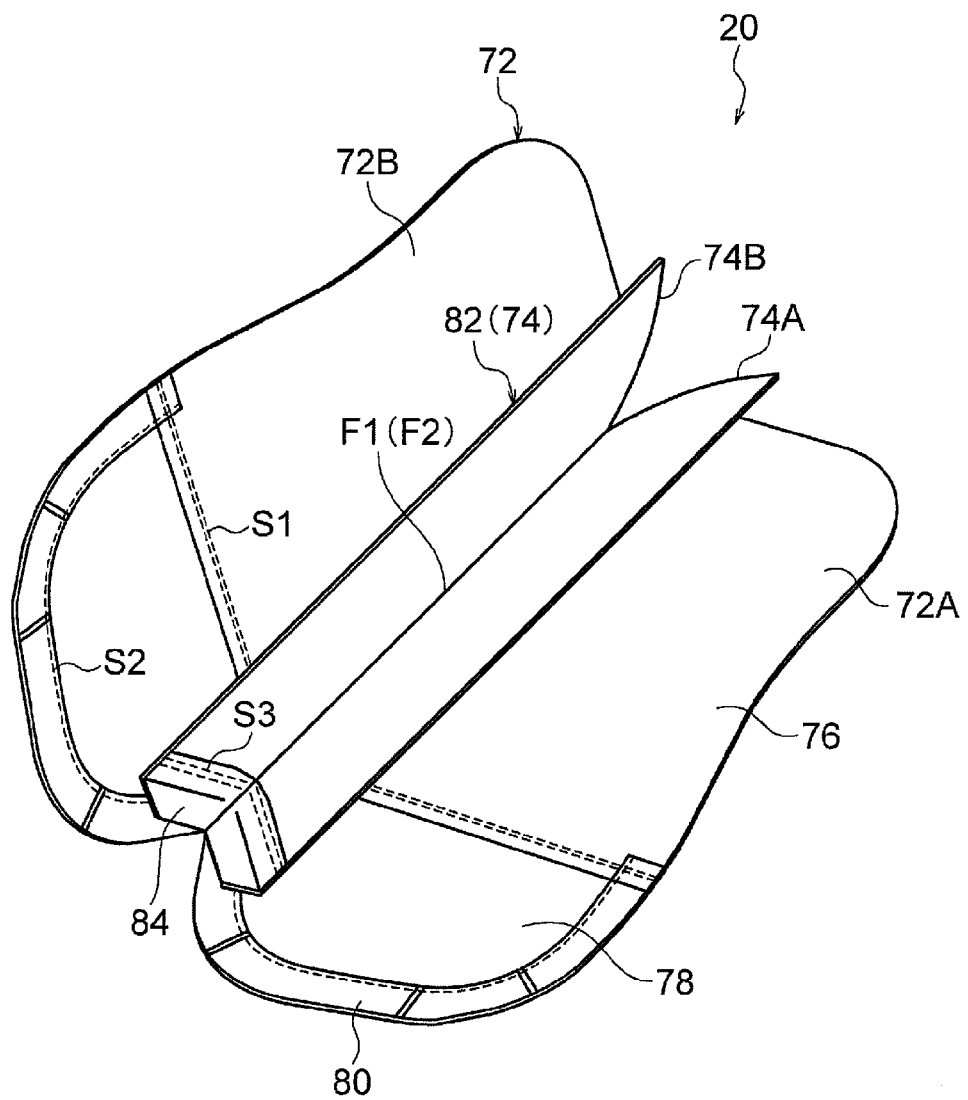
FIG. 5 is a perspective view showing the structures of a main panel and an inner panel that are structural members of the side airbag.
Figure 6:
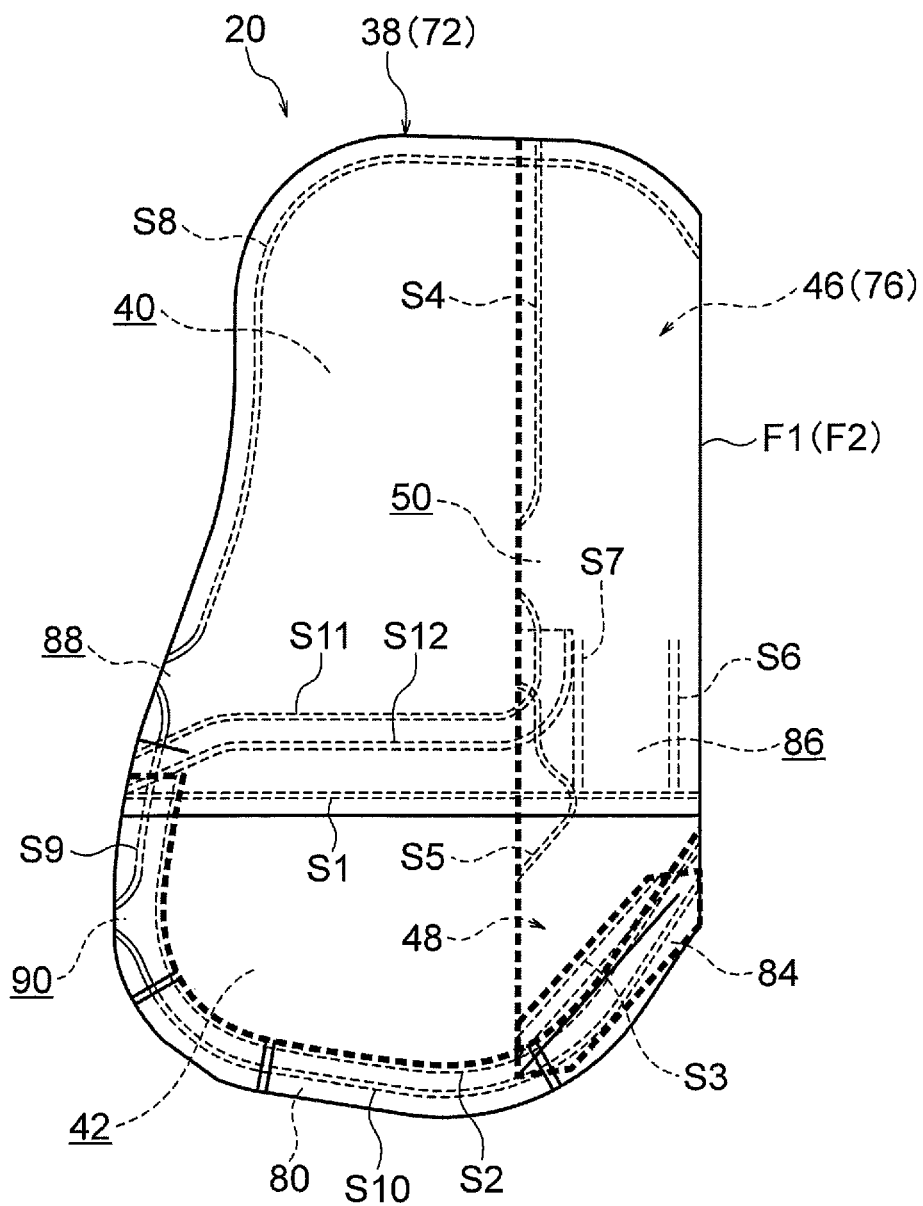
FIG. 6 is a side view showing a state after sewing of the side airbag.

At the time when this side airbag 20 is sewn, first, as shown in FIG. 5, the inner panel 74 is folded in two at central fold line F1, and an inner side portion 74A and an outer side portion 74B of the inner panel 74 are superposed together, and the inner side portion 74A and the outer side portion 74B are sewn together at sewn portions S4, S5 (see FIG. 4 and FIG. 6). Due thereto, the inner panel 74 is sewn in the shape of an elongated tube. Further, due to the inner side portion 74A and the outer side portion 74B being sewn together at sewn portions S6, S7 (see FIG. 4 and FIG. 6), an inflator insertion portion 86 (see FIG. 1 and FIG. 6) that is tubular is formed.

Next, the base cloth 78 is folded in two at central fold line F2, and the upper end portion of the base cloth 78 is sewn at sewn portions S11, S12 (see FIG. 4 and FIG. 6), and the tether 39 is thereby formed. This tether 39 is sewn to the vertical direction intermediate portion of the inner bag 46 by the sewn portions S11, S12. Due thereto, positional offset of the vertical direction intermediate portion of the inner bag 46 with respect to the tether 39 is prevented. Further, the communication hole 50 is formed between the sewn portion S4 and the sewn portion S11 by omitting sewing at a portion.

Next, as shown in FIG. 6, the main panel 72 is folded in two at the central fold line F2, and the inner side portion 72A and the outer side portion 72B are superposed together in a state in which the inner panel 74 is nipped at the central fold line F2 side between the inner side portion 72A and the outer side portion 72B of the main panel 72. In this state, the inner side portion 72A and the outer side portion 72B are sewn together at sewn portions S8, S9, S10 (see FIG. 4 and FIG. 6). Due thereto, the main panel 72 is sewn into the shape of a bag and the main bag 38 is formed, and the interior of the main bag 38 is sectioned by the tether 39 into the chest region chamber 40 at the upper side and the lumbar region chamber 42 at the lower side. Further, the upper end portion and the lower end portion of the inner panel 74 are sewn to the main panel 72 at the sewn portions S8, S10, and the inner bag 46 and the inner tube 48, that are elongated bag shaped, are formed. The upper end opening portion of this inner tube 48 is disposed adjacent to the lower end opening portion of the inflator insertion portion 86.

Further, vent holes 88, 90 (see FIG. 6) are respectively formed between the sewn portion S8 and the sewn portion S9, and between the sewn portion S9 and the sewn portion S10, due to sewing being omitted at portions. The chest region chamber 40 and the lumbar region chamber 42 are communicated with the exterior of the side airbag 20 via these vent holes 88, 90. Therefore, the gas, that is supplied to the chest region chamber 40 and the lumbar region chamber 42, is discharged-out to the exterior of the side airbag 20 via the vent holes 88, 90. Due thereto, the internal pressures of the chest region chamber 40 and the lumbar region chamber 42 rising too much is prevented. Note that the above-described sewing is carried out in each case by planar sewing.

At the side airbag 20 that is sewn as described above, as explained above, the main bag 38 and the inner bag 46 inflate and expand due to gas from the inflator 22 being supplied via the inner bag 46 to the chest region chamber 40 and the lumbar region chamber 42. Due thereto, the seat bag pad 26 splits into the inner side portion 34 and the outer side portion 36, and the seat skin 24 splits at the sewn portion 32. As a result, as shown in FIG. 3, an opening portion 92 is formed at the front surface side of the door-side side portion 14A, and the main bag 38 inflates and expands toward the vehicle front side of the door-side side portion 14A via this opening portion 92.

Here, in the present embodiment, as shown in FIG. 1, the shape of the main bag 38 is set such that, at the time of inflation and expansion, a longitudinal direction dimension L1 of the chest region chamber 40 side (the upper portion side) is smaller than a longitudinal direction dimension L2 of the lumbar region chamber 42 side (the lower portion side). On the other hand, the inner bag 46 inflates and expands at the rear end side of the main bag 38 so as to be long vertically. A front edge portion 46A at the time of inflation and expansion of this inner bag 46 is formed so as to run along a front edge portion 14A1 of the door-side side portion 14A, and the shape of the inner bag 46 is set such that, at the time of inflation and expansion, the front edge portion 46A is positioned further toward the vehicle rear side than the front edge portion 14A1 as seen in side view. In detail, the shape of the inner bag 46 is set such that, at the time of inflation and expansion, the inner bag 46 is positioned further toward the vehicle rear side than the aforementioned opening portion 92, i.e., is positioned within the door-side side portion 14A as shown in FIG. 3. In other words, the inner bag 46 is formed so as to inflate and expand further toward the vehicle rear side than an imaginary line X that connects the front end of the front surface portion 28 and the front end of the frame portion 30 in the state in which the sewn portion 32 has split.

Further, as shown in FIG. 1, the inner bag 46 is formed such that, at the time of inflation and expansion, the communication hole 50 is positioned at the lower portion side, and gas within the inner bag 46 is supplied via this communication hole 50 to the lower portion side of the chest region chamber

40. However, because the upper portion side of the inner bag 46 is closed-off by the sewn portions S4, S8, gas does not flow-out from the upper portion side of the inner bag 46.

(Operation and Effects)

The operation and effects of the present first embodiment are described next. In the side airbag device 10 of the above-described structure, when the side airbag sensor 62 senses that the vehicle is in a side collision or has overturned or the like, the side airbag ECU 60 operates the inflator 22. Due thereto, when gas is supplied from the inflator 22 to the inner bag 46, the supplied gas is supplied to the main bag 38 while the inner bag 46 inflates and expands. Due thereto, the main bag 38 inflates and expands, and the seat bag pad 26 and the sewn portion 32 of the seat skin 24 receive the inflation pressure of the main bag 38 and the inner bag 46 and split. Due thereto, the opening portion 92 is formed at the front surface side of the door-side side portion 14A, and the main bag 38 inflates and expands toward the vehicle front side of the door-side side portion 14A via this opening portion 92.

Here, at the time of inflation and expansion of the main bag 38 and the inner bag 46, the internal pressure of the inner bag 46 becomes higher than the internal pressure of the main bag 38, but the inner bag 46 is structured so as to be positioned further toward the vehicle rear side than the front edge portion 14A1 of the door-side side portion 14A as seen in side view. Therefore, as shown in FIG. 1, even in a case in which the main bag 38 and the inner bag 46 inflate and expand in a state in which the passenger 70 is positioned at the vehicle front of the door-side side portion 14A which is other than the regular seated position, the passenger 70 receiving load from the high-pressure inner bag 46 can be prevented or effectively suppressed. Due thereto, the safety of the passenger 70 can be improved to better than the conventional art.

To describe this point in detail, in a so-called two-chamber side airbag or three-chamber side airbag, the rise rate and the output of the inflator are set to be high as compared with a so-called one-chamber side airbag, and therefore, the expansion speed of the side airbag is fast and the internal pressure of the side airbag is high. Thus, there is a problem with regard to the point of improving the robustness of the so-called OOP performance (the performance that expresses the degree of safety of the passenger at the time when a side airbag inflates and expands in a state in which the passenger is not seated in the regular seated position). Namely, the expansion speed of the side airbag being slow, and the internal pressure of the side airbag being low, can improve the robustness of the OOP performance. However, when the rise rate and the output of the inflator are decreased, the performance of restraining the passenger deteriorates. Therefore, contradictory performances are required in that the robustness of the OOP performance must be ensured without decreasing the restraining performance, i.e., the rise rate and the output of the inflator.

With regard to this point, in the present embodiment, the inner bag 46 that has higher pressure than the main bag 38 is structured so as to, at the time of inflation and expansion, be positioned further toward the vehicle rear side than the front edge portion 14A1 of the door-side side portion 14A as seen in side view. Due thereto, the passenger 70 receiving load from the high-pressure inner bag 46 can be prevented or effectively suppressed, and thus, the robustness of the OOP performance can be improved without lowering the rise rate and the output of the inflator.

Moreover, in order to improve the robustness of the OOP performance, in the initial stage of expansion of the side airbag in particular, it is desirable to reduce the load that the neck region and the upper portion side at the chest region of the passenger receive from the side airbag, and, in the present embodiment, the chest region chamber 40 at which the inner bag 46 is disposed is structured to have lower pressure than the lumbar region chamber 42. Accordingly, such a structure is ideal.

Further, in the present embodiment, the shape of the inner bag 46 is set such that the inner bag 46 is positioned further toward the vehicle rear side than the opening portion 92 at the time of inflation and expansion. Therefore, even in a case in which the main bag 38 and the inner bag 46 inflate and expand in a state in which the passenger 70 is positioned at the vehicle front of the opening portion 92, the passenger 70 receiving load from the high-pressure inner bag 46 can be prevented or effectively suppressed.

Moreover, in the present embodiment, the inner bag 46 inflates and expands within the door-side side portion 14A, i.e., within a range of not jutting-out toward the outer side of the door-side side portion 14A. Thus, the passenger 70 receiving load from the high-pressure inner bag 46 can be prevented or effectively suppressed regardless of the seated position of the passenger 70 (the passenger 64).

Further, in the present embodiment, when the internal pressure of the lumbar region chamber 42 rises to greater than or equal to the set value due to the gas that is supplied from the inner bag 46 via the inner tube 48, the inner tube 48 is crushed and closes-off. Due thereto, backward flowing of gas from the lumbar region chamber 42 to the inner bag 46 can be impeded, and the internal pressure of the lumbar region chamber 42 can be maintained in a high state. Therefore, the lumbar region of the passenger 70, whose impact-resistance is higher than that of the chest region of the passenger 70, can be restrained well by the lumbar region chamber 42.

Further, in the present embodiment, the main bag 38 inflates and expands such that the longitudinal direction dimension L1 of the chest region chamber 40 side becomes smaller than the longitudinal direction dimension L2 of the lumbar region chamber 42 side. Thus, even if the main bag 38 inflates and expands in a state in which the passenger 70 is positioned in the direction of inflation and expansion of the main bag 38, the load that the neck region and the upper portion side of the chest region of the passenger 70 receive from the upper portion side of the main bag 38 can be reduced.

Further, in the present embodiment, the gas that is supplied from the inflator 22 to the inner bag 46 is supplied to the main bag 38 via the communication hole 50 that is formed at the lower portion side of the inner bag 46, but the upper portion side of the inner bag 46 is closed-off. Due thereto, the internal pressure of the upper portion side of the main bag 38 in the initial stage of expansion can be made to be low. Thus, even in a case in which the main bag 38 inflates and expands in a state in which the passenger 70 is positioned in the direction of inflation and expansion of the main bag 38, the load that the neck region and the upper portion side of the chest region of the passenger 70 receive from the upper portion side of the main bag 38 can be reduced.

Another embodiment of the present invention is described next. Note that structures/operations that are basically similar to those of the above-described first embodiment are denoted by the same reference numerals as in the above-described first embodiment, and description thereof is omitted.

<Second Embodiment>

Figure 7:
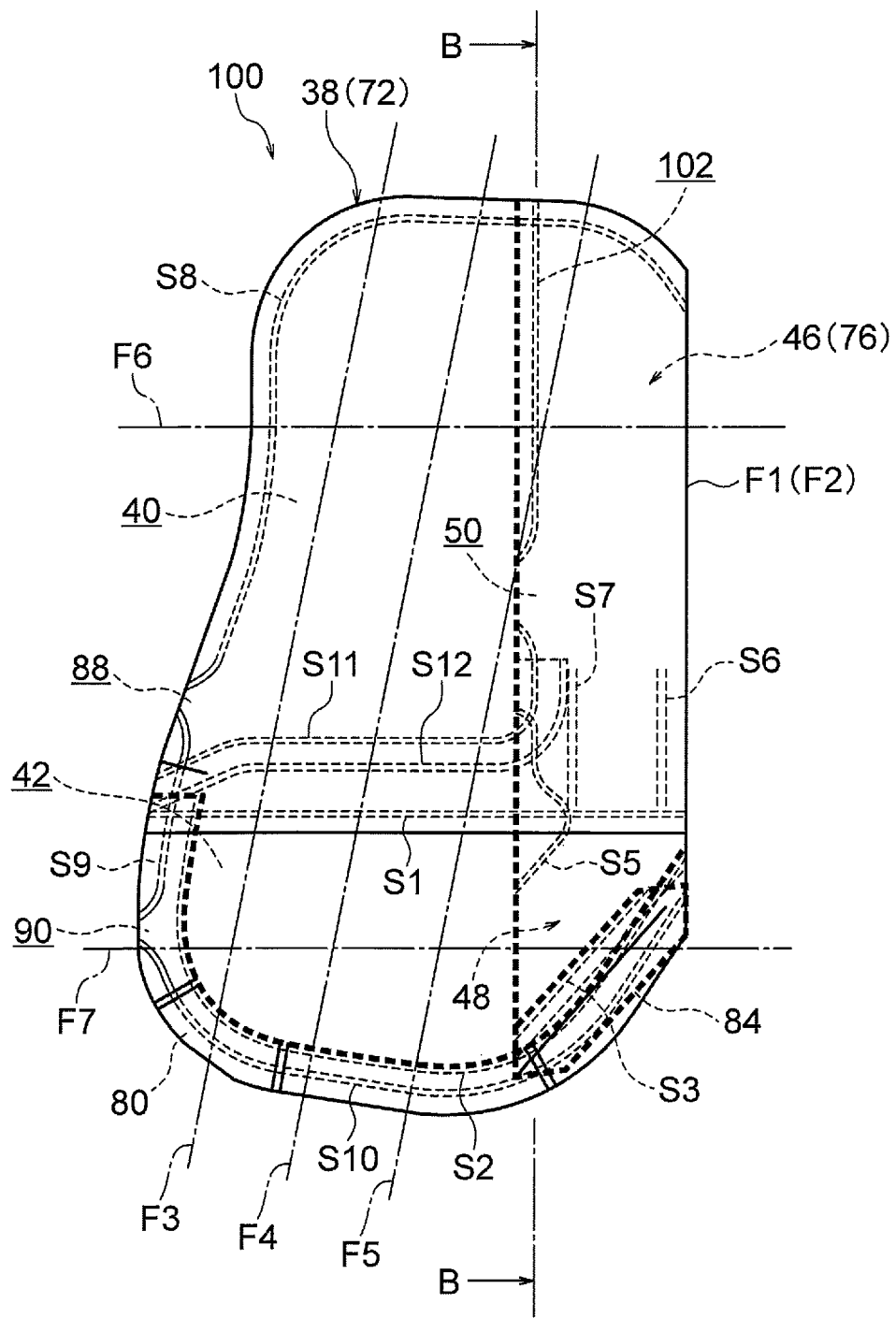
FIG. 7 is a side view that corresponds to FIG. 6 and shows the structure of a side airbag of a side airbag device for a vehicle relating to a second embodiment of the present invention.

A side view, that shows a state after sewing of a side airbag 100 that is a structural member of a side airbag device for a vehicle relating to a second embodiment of the present invention, is shown in FIG. 7. This side airbag 100 is structured basically similarly to the side airbag 20 relating to the above-described first embodiment, but a communication hole 102 is formed at the upper portion side of the inner bag 46 due to the sewn portion S4 being omitted at the upper portion side of the inner bag 46. Therefore, the gas, that is supplied from the inflator 22 to the interior of the inner bag 46, is supplied to the interior of the chest region chamber 40 via the communication hole 50 at the lower portion side of the inner bag 46 and the communication hole 102 at the upper portion side. Due thereto, the expansion speed of the chest region chamber 40 can be made to be faster.

Figure 8:
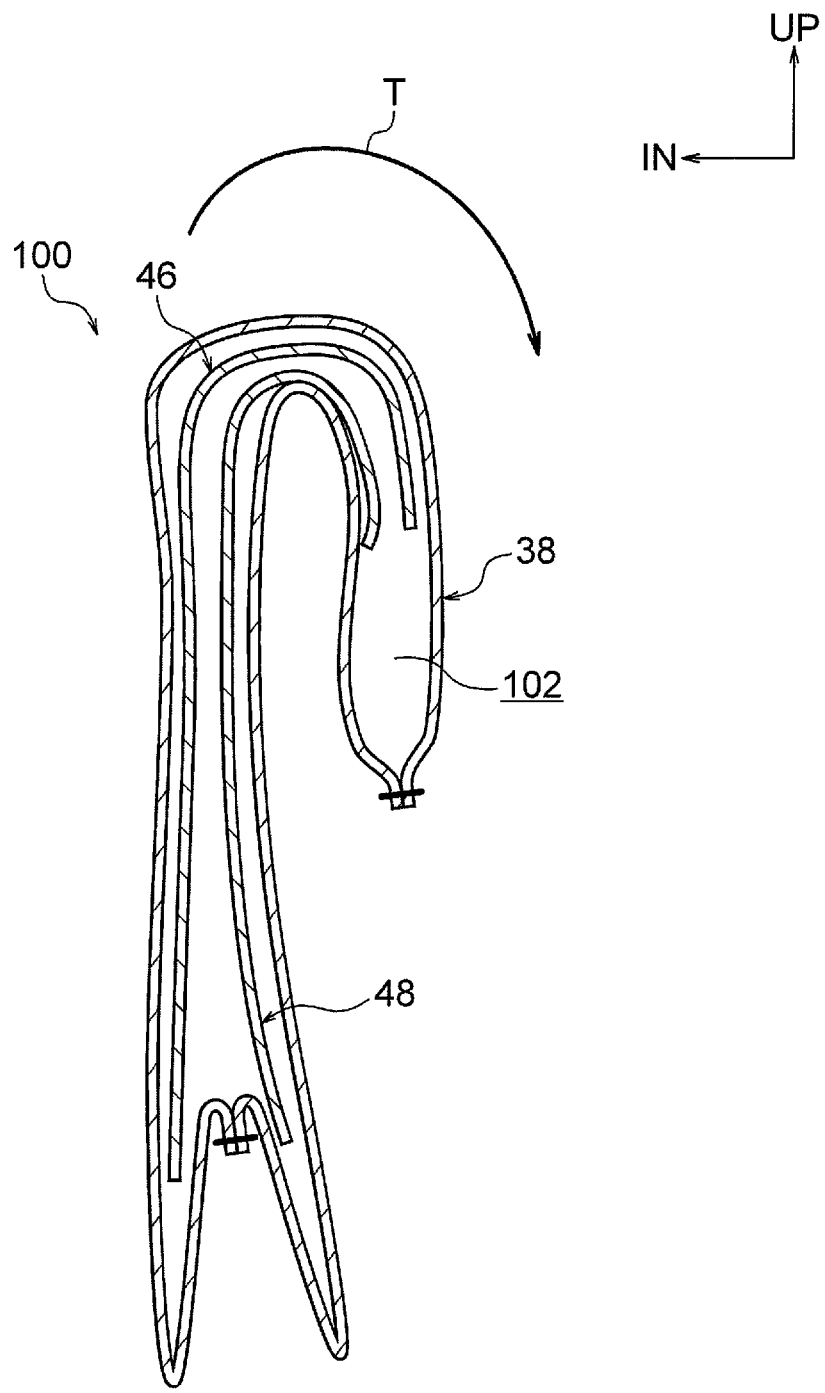
FIG. 8 is a schematic vertical sectional view showing a state in which the side airbag is folded-up at fold lines F6, F7 of FIG. 7, and is a drawing corresponding to the position of line B-B of FIG. 7.

However, in this embodiment, at the time when the side airbag 100 is folded-up, first, the side airbag 100 is bellows-folded along fold lines F3, F4, F5 of FIG. 7, and thereafter, the upper portion side and the lower portion side of the side airbag 100 are folded-up along fold lines F6, F7 of FIG. 7. At this time, as shown in FIG. 8, at the lower portion side of the side airbag 100, the lower end side of the main bag 38 is folded-up toward the inner side of the main bag 38 substantially in a W-shape in cross-section. On the other hand, at the upper portion side of the side airbag 100, the main bag 38 and the inner bag 46 are folded in two toward the vehicle transverse direction outer side, further toward the lower side than the communication hole 102 (see arrow T in FIG. 8). Due thereto, the communication hole 102 at the upper portion side of the inner bag 46 is closed-off. Thus, until the folded-up portion at the upper portion side of the side airbag 100 expands due to gas being supplied to the interior of the inner bag 46, the gas that is within the inner bag 46 cannot flow through the communication hole 102 at the upper portion side to the chest region chamber 40, and flows only from the communication hole 50 at the lower portion side to the chest region chamber 40. Due thereto, inflation in the vehicle longitudinal direction of the upper portion side of the main bag 38 in the initial stage of expansion can be suppressed, and thus, the load that the neck region and the upper portion side of the chest region of the passenger receive from the upper portion side of the main bag 38 can be reduced.

Moreover, in the present embodiment, the upper portion side of the side airbag 100 is folded in two toward the vehicle transverse direction outer side. However, at the vehicle transverse direction outer side of the side airbag 100, there is ample space between the side airbag 100 and the door trim 66, and therefore, this portion that is folded in two can be expanded smoothly.

<Supplementary Explanation of Embodiments>

In the above-described second embodiment, there is a structure in which the upper portion side of the inner bag 46 is, together with the upper portion side of the main bag 36, folded in two toward the vehicle transverse direction outer side. However, the present invention is not limited to this, and there may be a structure in which the upper portion side of the inner bag is, together with the upper portion side of the main bag, folded in two toward the vehicle transverse direction inner side.

Further, in the above-described respective embodiments, there is a structure in which the shape of the main bag 36 is set such that the longitudinal direction dimension L1 of the upper portion side is smaller than the longitudinal direction dimension L2 of the lower portion side, in a case in which the inflated and expanded state is viewed in side view. However, the present invention is not limited to this, and the shape of the main bag 36 can be set and changed appropriately.

Further, in the above-described respective embodiments, there is a structure in which the inner tube 48 functions as a check valve, but the present invention is not limited to this, and there may be a structure in which the inner tube does not function as a check valve.

Further, in the above-described respective embodiments, there is a structure in which the tether 39 is formed by the upper end portion of the base cloth 78, that structures the lumbar region chamber 42, being sewn at the sewn portions S11, S12. However, the present invention is not limited to this, and there may be a structure in which the tether is formed by the lower end portion of the base cloth 76, that structures the chest region chamber 40, being sewn. In this case, there is a structure in which the upper end portion of the base cloth 78 is sewn to the vertical direction intermediate portion of the base cloth 76. Further, the tether may be formed by a base cloth that is a body separate from the base cloths 76, 78, or the chest region chamber and the lumbar region chamber may be sectioned by a sewn portion (a seam).

Further, in the above-described respective embodiments, there is a structure in which the interior of the main bag 36 is sectioned into the chest region chamber 40 and the lumbar region chamber 42, but the present invention is not limited to this. For example, there may be a structure in which a shoulder portion chamber, that is sectioned for restraining the shoulder portion of the passenger, is provided at the side of the chest region chamber opposite the side at which the lumbar region chamber is provided (a structure in which the main bag is made to be a so-called three-chamber side airbag). Further, for example, there may be a structure in which the interior of the main bag is not sectioned (a structure in which the main bag is made to be a so-called one-chamber side airbag). Note that, in a case in which the main bag is a one-chamber side airbag that can restrain from the chest region to the lumbar region of the passenger, it is preferable to set the inner bag at the chest region chamber and the lumbar region chamber, and to form, in the inner bag, plural communication holes that are apart in the vertical direction.

Further, in the above-described respective embodiments, there is a structure in which the shape of the inner bag 46 is set such that, at the time of inflation and expansion, the inner bag 46 is positioned further toward the vehicle rear side than the opening portion 92 of the door-side side portion 14A. However, the present invention is not limited to this. It suffices for the inner bag to be positioned further toward the vehicle rear side than at least one of the both edge portions (in the above-described respective embodiments, the front end of the front surface portion 28 of the seat skin 24 and the front end of the frame portion 30) of the opening portion at the time of inflation and expansion.

Further, in the above-described respective embodiments, there is a structure in which the communication hole 50 is formed at the lower portion side of the inner bag 46 due to sewing being omitted between the sewn portion S4 and the sewn portion S11 of the inner bag 46. However, the present invention is not limited to this, and there may be a structure in which the communication hole is formed by a portion of the inner bag being cut away. This point is the same also for the communication hole 102 (the communication hole at the upper portion side of the inner bag) in the above-described second embodiment.

Further, in the above-described respective embodiments, there is a structure in which the entire inner bag 46 is positioned further toward the vehicle rear side than the front edge portion 14A1 of the door-side side portion 14A as seen in side view at the time of inflation and expansion. However, the present invention is not limited to this. It suffices for at least the portion of the inner bag, which portion is formed in a bag shape, to be positioned further toward the vehicle rear side than the front edge portion of the side portion of the seat back as seen in side view at the time of inflation and expansion, and a portion of the sewing margin or a portion of the periphery of the communication hole may be positioned further toward the vehicle front side than the front edge portion of the side portion.

In addition, the present invention can be implemented by being modified in various ways within a scope that does not depart from the gist thereof. Further, it goes without saying that the scope of the right of the present invention is not limited to the above-described respective embodiments.

The invention claimed is:

1. A side airbag device for a vehicle, the side airbag device comprising:
   an inflator configured to be supported at a side frame disposed within a side portion of a seat bag, and that supplies gas for inflation and expansion; and
   a side airbag that has
   (i) a main bag, that is stored in a folded-up state within the side portion and that inflates and expands toward a vehicle front side of the side portion at a time when the gas for inflation and expansion is supplied thereto, and
   (ii) an inner bag, (a) that is disposed within the main bag, (b) that supplies supplied gas to the main bag while inflating and expanding due to the gas for inflation and expansion being supplied from the inflator to the inner bag, (c) that, at a time of inflation and expansion, is positioned further toward a vehicle rear side than a front edge portion of the side portion as seen in side view, and (d) that includes an upper portion side which is closed-off.

2. The side airbag device of claim 1, wherein
   a sewn portion of a seat skin, that receives inflation pressure of the side airbag and splits, is provided at a front portion side of the side portion,
   due to the sewn portion splitting, an opening portion for inflating and expanding the main bag is formed at a front surface side of the side portion, and
   a shape of the inner bag is set such that, at the time of inflation and expansion, the inner bag is positioned further toward the vehicle rear side than the opening portion.

3. The side airbag device of claim 1, wherein a shape of the inner bag is set such that the inner bag inflates and expands within the side portion.

4. The side airbag device of claim 1,
   wherein an interior of the main bag is sectioned into a chest region chamber configured to restrain a chest region of a passenger and a lumbar region chamber configured to restrain a lumbar region of the passenger, and
   the inner bag is provided at the chest region chamber, communicates with the chest region chamber via a communication hole, and communicates with the lumbar region chamber via an inner tube.

5. The side airbag device of claim 4, wherein the inner tube structures a check valve that closes-off due to internal pressure of the lumbar region chamber rising to a value that is greater than or equal to a set value.

6. The side airbag device of claim 1, wherein a shape of the main bag is set such that a longitudinal direction dimension of an upper portion side of the main bag is smaller than a longitudinal direction dimension of a lower portion side of the main bag, in a case of viewing an inflated and expanded state in side view.

7. The side airbag device of claim 1,
   wherein a communication hole, that communicates an interior of the main bag and an interior of the inner bag, is formed at a lower portion side of the inner bag.

8. The side airbag device of claim 1,
   wherein communication holes, that communicate an interior of the main bag and an interior of the inner bag, are formed adjacent to the upper portion side and at a lower portion side of the inner bag, and
   in a folded-up state of the main bag, the upper portion side of the inner bag is folded in two in a vehicle transverse direction.

9. The side airbag device of claim 8, wherein, in the folded-up state of the main bag, the upper portion side of the inner bag is folded in two toward a vehicle transverse direction outer side.

* * * * *